Patented Apr. 10, 1923.

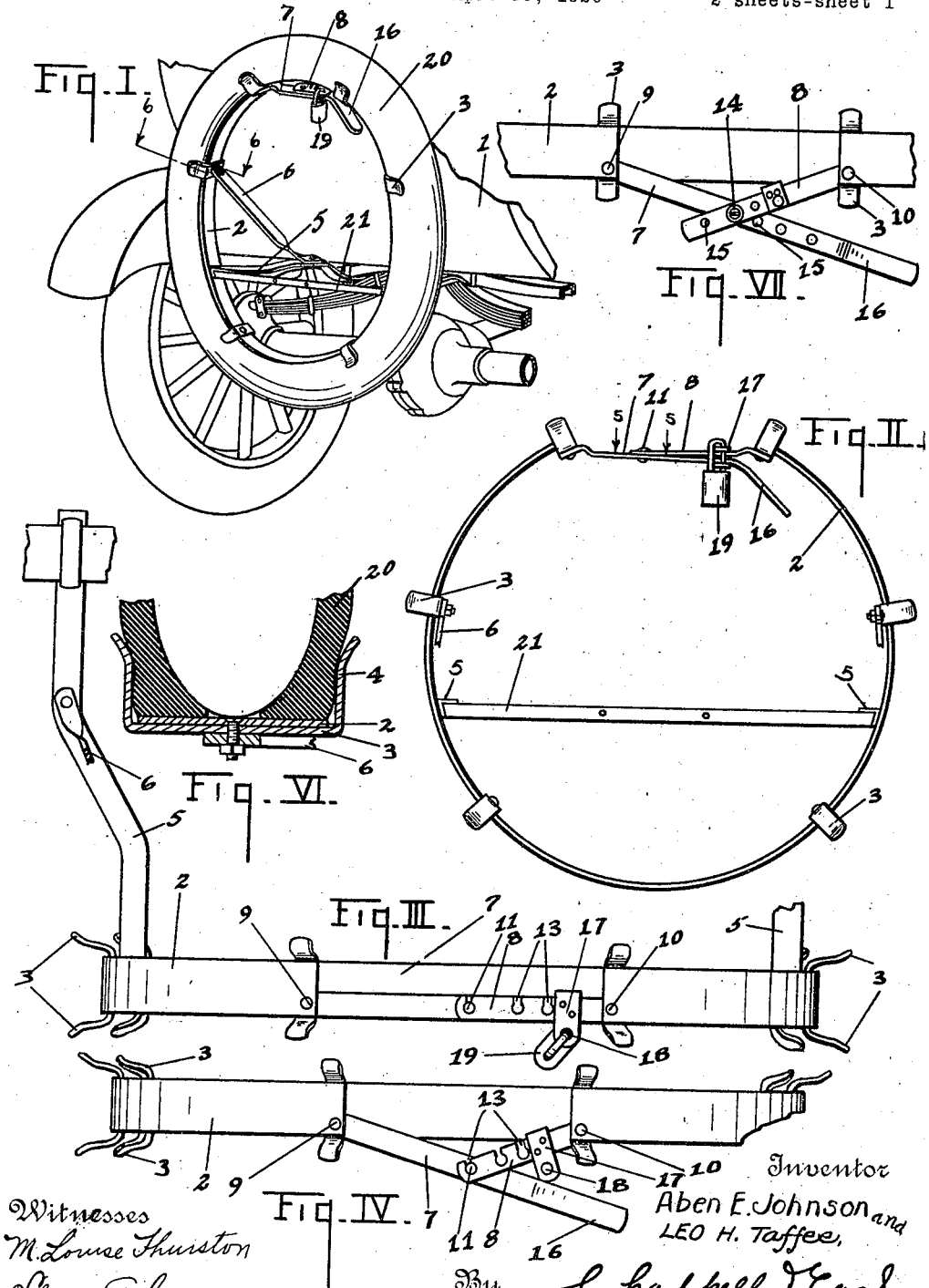

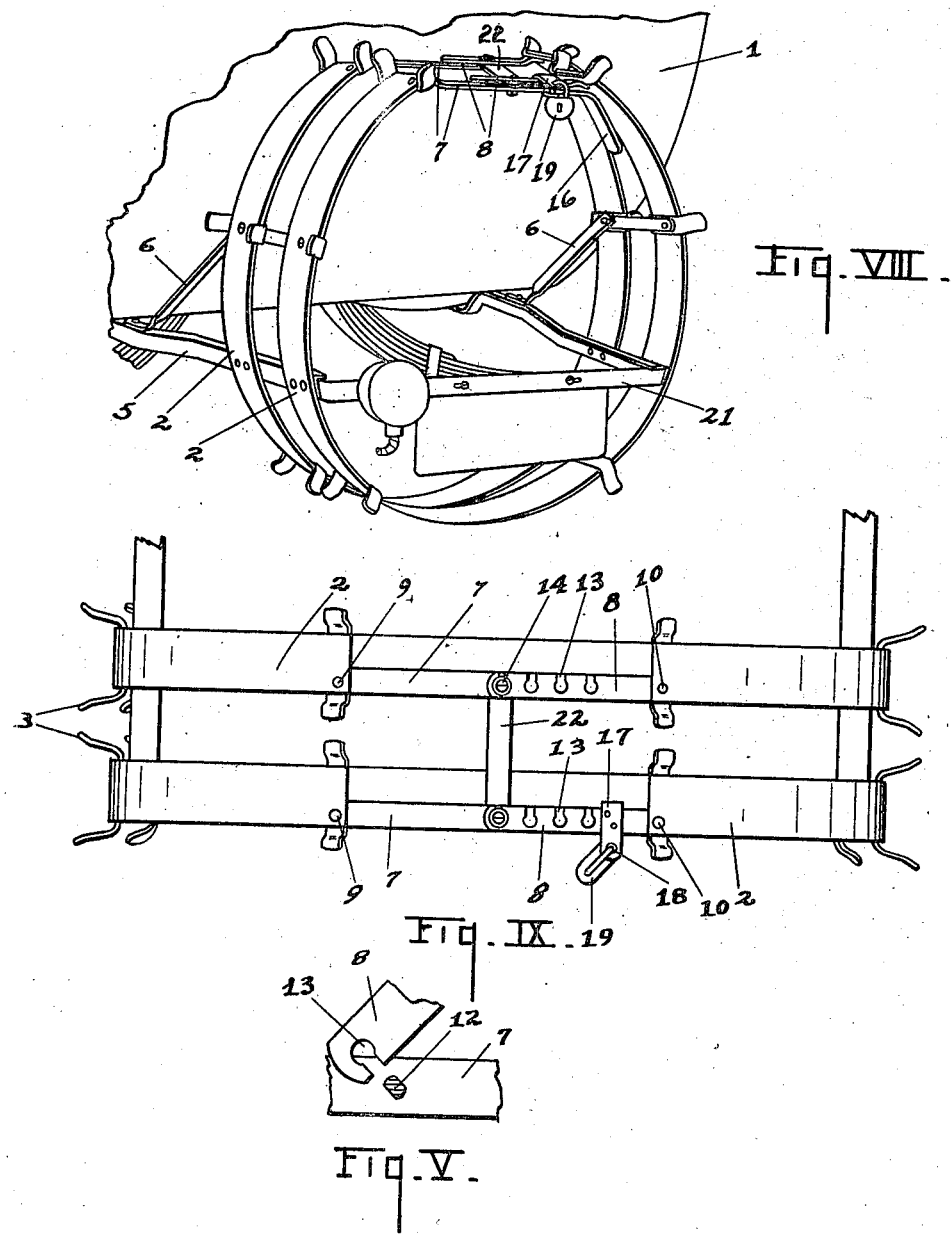

1,451,262

UNITED STATES PATENT OFFICE.

ABEN E. JOHNSON AND LEO H. TAFFEE, OF HASTINGS, MICHIGAN, ASSIGNORS TO HASTINGS MANUFACTURING COMPANY, OF HASTINGS, MICHIGAN.

TIRE CARRIER.

Application filed April 30, 1920. Serial No. 377,954.

*To all whom it may concern:*

Be it known that we, ABEN E. JOHNSON and LEO H. TAFFEE, citizens of the United States, residing at Hastings, county of Barry, State of Michigan, have invented certain new and useful Improvements in Tire Carriers, of which the following is a specification.

This invention relates to improvements in tire carriers.

The main objects of this invention are:

First, to provide an improved tire carrier which may be readily adjusted to tires of different sizes.

Second, to provide an improved tire carrier which is quickly adjusted to release or secure a tire and one which is light in weight and simple and economical in structure.

Further objects, and objects relating to structural details, will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing forming a part of this specification, in which:

Fig. I is a detail rear perspective view of an automobile having one of our improved tire carriers thereon.

Fig. II is a rear view of one of our improved tire carriers.

Fig. III is a plan view thereof in its locked position, one of the supporting brackets or arms being broken away and the other shown mounted upon a vehicle part.

Fig. IV is a plan view of our improved tire carrier in its unlocked or collapsed position with parts partially broken away.

Fig. V is a detail section on a line corresponding to line 5—5 of Fig. II, showing details of the adjustable connection for the locking links.

Fig. VI is a detail transverse section on a line corresponding to line 6—6 of Fig. I, showing the manner of supporting the tire.

Fig. VII is a detail plan view of a modified form of our invention, the modification being in the actuating links.

Fig. VIII is a detail rear perspective view of a vehicle body having one of our improved double tire carriers mounted thereon.

Fig. IX is a plan view of our improved double tire carrier, the supporting brackets being broken away.

In the drawing similar reference characters refer to similar parts throughout the several views, and the sectional views are taken looking in the direction of the little arrows at the ends of the section lines.

Referring to the drawing, we have shown a motor vehicle 1 with one of our improved tire carriers mounted thereon in order to illustrate one manner of mounting or using.

Our improved tire carrier in the single form illustrated in Figs. I to VII, inclusive, comprises a split ring 2 of flat cross section having outwardly projecting fingers 3 thereon adapted to receive a tire as 4. The ring 2 is mounted on the arms or brackets 5 projecting rearwardly from the body of the vehicle. A brace 6 extends from one side of the ring to one of the arms 5.

The ring is contracted and expanded by means of the links 7 and 8, the link 7 being pivoted to one end of the ring at 9 while the link 8 is pivoted to the other end of the ring at 10. The link 7 is provided with a headed stud 11 flattened on opposite sides as at 12 so that it may be passed into the key-hole shaped pivot openings 13 of the link 8 when the same is presented thereto edge-wise as shown in Fig. V. This provides effective means for adjusting the carrier to different sizes of tires, it being possible to adjust the carrier without the aid of tools.

In the modification shown in Fig. VII, the pivot 14 is removed to be adjusted in the holes 15 in the links. The link 7 is provided with a handle extension 16 the end of which is turned downwardly for convenience in grasping.

With this arrangement the links are actuated like a toggle and the toggle may be easily broken by forcing the links into alignment to expand the ring.

The link 8 is provided with a keeper 17 adapted to receive the handle portion of the link 7 when the links are swung into alignment. The ends of this keeper have holes 18 to receive the lock 19 so that the links are locked in their aligned or expanded position, thereby effectively supporting and retaining the tire 20. A cross piece 21 extends between the supporting arms 5 to provide a support on which the lamp and license plate may be mounted if desired as shown in the embodiment of Fig. VIII.

In Figs. VIII and IX, we illustrate a double carrier, there being a pair of the rings 2 mounted upon the supporting arms 5, the carrier being substantial duplicate of the single carrier described with the exception that the link 7 of the inner carrier is not provided with a handle. The pairs of actuating links are connected by the link 22 which engages the pivots 14 so that the rings are simultaneously expanded and contracted to secure or release the tires.

Our improved tire carrier is very conveniently manipulated to secure or release the tires. It is light in weight and economical in structure.

Having thus described our invention, what we claim as new and desire to secure by Letters Patent is:

1. In a tire carrier, the combination of a split ring of flat cross section provided with outwardly projecting tire engaging fingers, a supporting bracket on which said ring is mounted to permit its being contracted and expanded, means for contracting and expanding said ring and locking it in its expanded position comprising a pair of links pivoted to the ends of said ring, one of said links being provided with a handle extension and with a flattened pivot stud and the other with a plurality of key-hole shaped pivot holes opening at its edge and adapted to be engaged and disengaged with said pivot stud when it is presented edge wise thereto, a keeper adapted to receive said handle when the links are closed to expand the ring, and a lock engaged with said keeper to retain the handle therein.

2. In a tire carrier, the combination of a split ring of flat cross section provided with outwardly projecting tire engaging fingers, a supporting bracket on which said ring is mounted to permit its being contracted and expanded, and means for contracting and expanding said ring comprising a pair of links pivoted to the ends of said ring, one of said links being provided with a flattened pivot stud and the other with a plurality of key-hole shaped pivot holes opening at its edge and adapted to be engaged and disengaged with said pivot stud when it is presented edge-wise thereto.

3. In a tire carrier, the combination of a split ring adapted to receive a tire, the ends of the ring being substantially spaced, a supporting bracket on which said ring is mounted to permit its being contracted and expanded, means for contracting and expanding said ring and locking it in its expanded position comprising a pair of links pivoted to the ends of said ring, a pivot stud on one of said links, the other being provided with a plurality of key-hole pivot holes adapted to receive said pivot stud whereby the links are adjustably connected, pivots connecting said links to the ends of said ring and said pivot stud being disposed vertically and arranged so that the links swing laterally and close into the plane of the rim, one of said links being provided with a handle extension and the other with a keeper adapted to receive said handle when the links are closed to expand the ring, and a lock engaged with said keeper to retain the handle therein.

4. In a tire carrier, the combination of a split ring adapted to receive a tire, the ends of the ring being substantially spaced, a supporting bracket on which said ring is mounted to permit its being contracted and expanded, means for contracting and expanding said ring and locking it in its expanded position comprising a pair of links pivoted to the ends of said ring, and a pivot stud on one of said links, the other being provided with a plurality of keyhole pivot holes adapted to receive said pivot stud whereby the links are adjustably connected, pivots connecting said links to the ends of said ring and said pivot stud being disposed vertically and arranged so that the links swing laterally and close into the plane of the rim.

5. In a tire carrier, the combination of split tire supporting rings, a support on which said rings are mounted to permit their being contracted and expanded, pairs of links pivotally connected to the ends of said rings and to each other, one of the outer pair of links being provided with a hand piece and the other with a keeper adapted to receive said hand piece when the links are aligned to expand the rings, a lock engaging with said keeper to retain the handle therein, and a link connecting said pairs of links engaged with the connecting pivots thereof whereby they are simultaneously operated.

6. In a tire carrier, the combination of split tire supporting rings, a support on which said rings are mounted to permit their being contracted and expanded, pairs of links pivotally connected to the ends of said rings and to each other, and a link connecting said pairs of links engaged with the connecting pivots thereof whereby they are simultaneously operated.

7. In a tire carrier, the combination of split tire supporting rings, a support on which said rings are mounted to permit their being contracted and expanded, pairs of links pivotally connected to the ends of said rings and to each other, the connections for the links to each other being adjustable, and a link connecting said pairs of links engaged with the connecting pivots thereof whereby they are simultaneously operated.

In witness whereof, we have hereunto set our hands and seals in the presence of two witnesses.

ABEN E. JOHNSON. [L. S.]
LEO H. TAFFEE. [L. S.]

Witnesses:
 MARCELEINE EDGER,
 LOUISE NEWTON.